United States Patent
Patel et al.

(10) Patent No.: US 7,606,360 B2
(45) Date of Patent: Oct. 20, 2009

(54) AUTOMATED SYSTEM AND METHOD FOR HANDLING HUMAN AND CALLER QUEUES

(75) Inventors: Labhesh Patel, San Francisco, CA (US); Sanjeev Kumar, San Francisco, CA (US); Mukul Jain, San Jose, CA (US); Joseph F. Khouri, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 11/444,851

(22) Filed: May 31, 2006

(65) Prior Publication Data

US 2007/0280468 A1    Dec. 6, 2007

(51) Int. Cl.
*H04M 3/00* (2006.01)
*H04M 5/00* (2006.01)

(52) U.S. Cl. .............................. 379/266.01; 379/265.01

(58) Field of Classification Search ................................
379/265.01–265.05, 266.01; 235/375; 370/412, 370/420
See application file for complete search history.

(56) References Cited

U.S. PATENT DOCUMENTS

| | | | |
|---|---|---|---|
| 4,472,833 A | 9/1984 | Turrell et al. | |
| 5,249,223 A | 9/1993 | Vanacore | |
| 5,493,608 A | 2/1996 | O'Sullivan | |
| 5,509,064 A | 4/1996 | Welner | |
| 5,537,470 A | 7/1996 | Lee | |
| 5,866,890 A | 2/1999 | Neuner | |

(Continued)

FOREIGN PATENT DOCUMENTS

AU    PCT/AU99/00247    4/1999

(Continued)

OTHER PUBLICATIONS

Nigel Ward and Satoshi Nakagawa, "Automatic User-Adaptive Speaking Rate Selection For Information Delivery", June, 25, 2002 (4 pages), University of Tokyo, Tokyo, Japan.

(Continued)

*Primary Examiner*—Ahmad F Matar
*Assistant Examiner*—Sonia Gay
(74) *Attorney, Agent, or Firm*—The Law Offices of Bradley J. Bereznak (57) ABSTRACT

A system for handling service requests received from end-users that include telephone callers and persons who are physically present at a branch or store. The system includes an ACD and a ticket dispenser coupled with the ACD. The ticket dispenser being operable to first dispense a ticket having an identifier to each person who requests service at the branch or store, and then electronically communicate the identifier to the ACD. The ACD includes one or more queues to order calls received from the telephone callers and identifiers. The ACD routes either a call or a person to an available agent in accordance with an algorithm. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

15 Claims, 4 Drawing Sheets

U.S. PATENT DOCUMENTS

| | | | |
|---|---|---|---|
| 6,059,184 A * | 5/2000 | Ahlstrom et al. | 235/375 |
| 6,137,862 A | 10/2000 | Atkinson et al. | |
| 6,160,877 A | 12/2000 | Tatchell et al. | |
| 6,333,980 B1 | 12/2001 | Hollatz et al. | |
| 6,546,082 B1 | 4/2003 | Alcendor et al. | |
| 6,567,848 B1 | 5/2003 | Kusuda et al. | |
| 6,587,545 B1 | 7/2003 | Antonucci et al. | |
| 6,654,458 B1 | 11/2003 | Saleh | |
| 6,675,216 B1 | 1/2004 | Quatrano et al. | |
| 6,687,877 B1 | 2/2004 | Sastry et al. | |
| 6,697,457 B2 | 2/2004 | Petrushin | |
| 6,798,768 B1 | 9/2004 | Gallick et al. | |
| 6,798,877 B2 | 9/2004 | Johnson et al. | |
| 6,826,194 B1 | 11/2004 | Vered et al. | |
| 6,845,361 B1 | 1/2005 | Dowling | |
| 6,847,715 B1 | 1/2005 | Swartz | |
| 6,859,776 B1 | 2/2005 | Cohen et al. | |
| 6,871,212 B2 | 3/2005 | Khouri et al. | |
| 6,879,586 B2 | 4/2005 | Miloslavsky et al. | |
| 6,879,685 B1 | 4/2005 | Peterson et al. | |
| 6,882,641 B1 | 4/2005 | Gallick et al. | |
| 6,940,963 B2 | 9/2005 | Stumer et al. | |
| 7,249,025 B2 | 7/2007 | Junqua et al. | |
| 2002/0090076 A1 | 7/2002 | Uppaluru et al. | |
| 2002/0196928 A1 | 12/2002 | Johnson et al. | |
| 2003/0002650 A1 | 1/2003 | Gruchala et al. | |
| 2004/0109555 A1 | 6/2004 | Williams | |
| 2005/0002516 A1 | 1/2005 | Shtivelman | |
| 2005/0059463 A1 | 3/2005 | Gilmore et al. | |
| 2005/0069102 A1 | 3/2005 | Chang | |
| 2005/0089053 A1 * | 4/2005 | Zhu | 370/412 |
| 2005/0163302 A1 | 7/2005 | Mock et al. | |
| 2005/0286705 A1 | 12/2005 | Contolini et al. | |
| 2006/0030290 A1 | 2/2006 | Rudolf | |
| 2007/0127691 A1 * | 6/2007 | Lert | 379/265.05 |

FOREIGN PATENT DOCUMENTS

EP    1 030 504 A2    8/2000

OTHER PUBLICATIONS

Jing Zheng, Horacio Franco, and Andreas Stolcke, "Rate Of Speech Modeling for Large Vocabulary Conversation Speech Recognition", May 18, 2001, (5 pages). Speech Technology and Research Laboratory SRI International, http://www.speech.sri.com.

L.Melscoet, "Alcatel CCweb: Marriage Of The Internet With The Call Center The Alcatel Ccweb Enables a Company to Combine Its Web Site And Call Center Into a Powerful Contact Center", Electrical communication, Alcatel, Brussels, BE, No. 1, 2000, (pp. 43-47).

D.Steul, "Redefining The Call Center: Customer Service On The Internet", Alcatel telecommunications Review, Alcatel, Paris Cedex, FR, Mar. 2000, (6 pages).

* cited by examiner

AUTOMATED SYSTEM AND METHOD FOR HANDLING HUMAN AND CALLER QUEUES

FIELD OF THE INVENTION

The present invention relates generally to the field of automatic call distributors (ACDs); more specifically, to systems and methods for improved management of ACD queuing functions involving different categories of end-users.

BACKGROUND OF THE INVENTION

Many businesses routinely offer customer support services that can be accessed through public switched telephone networks (PSTNs) and Internet protocol (IP) enabled networks. In most cases, the customer or end-user can simply dial the phone number of the company's service line to talk to a service agent or operator. The traditional call center for handling service calls was based on a private branch exchange (PBX) that included core automatic call distributor (ACD) functions for connecting a caller to one of a plurality of agents. Most modern ACDs utilize an interactive voice response (IVR) system that provides information and channels calls to service agents in response to the spoken words or touch tone signaling of a telephone caller.

By way of example, U.S. Pat. No. 6,798,877 teaches a system in which a caller utilizes a personal computer (PC) for establishing an Internet connection to an ACD and for permitting a caller to select a particular agent. A system for providing information about a telephone caller to a telephone agent, wherein caller-specific data of the caller is used to generate a web page that displays the identified information to the agent is taught in U.S. Pat. No. 6,871,212. U.S. Pat. No. 6,847,715 discloses a system for operatively integrating an ACD and an IVR unit in which an interaction input from a caller is stored and then transmitted to an appropriate agent workstation. A method and apparatus for analyzing the performance of an IVR system with respect to routing of calls or contacts received in accordance with a contact flow model is described in U.S. Pat. No. 6,879,685.

Some ACD applications are deployed in a branch model where there is no centralized call center with full-time agents to answer incoming calls. In this model, the employees working at a branch on other tasks double as call center agents. For instance, a customer service agent at a retail store may be responsible for handling service requests from both incoming calls from the ACD application as well as persons present (e.g., standing in queue) at a customer service counter. In some cases, a ticket dispenser may be used to insure that persons requesting service at the counter are handled in the order they arrived. Individuals requesting service simply pull a ticket out of the dispenser, with the ticket a having a printed number that indicates the relative position of the person in the human queue.

Often times, the agents attempt to service the incoming phone calls and the people standing in line at the counter on an alternating basis (e.g., alternating equally between the callers and the persons present at the counter). The ACD application, however, is unaware of the human queue present at the service counter. That means that the ACD may continue to send calls to the agents behind the counter. The problem that arises is that an agent's normal reaction is to answer their phone soon after it starts ringing, thereby ignoring the people standing in line who may have been waiting for a very long time. As a result, in the branch model normal system operations usually end up granting priority to customers in the call queue over those customers who are physically present (i.e., in the human queue) at the service counter. This can cause real frustration among the persons standing in queue since their perception is that their service needs are either being ignored or treated with a lower priority status.

What is needed, therefore, is a mechanism for simultaneously managing both human and caller queues such that people physically waiting in queue at a service counter are treated on a par with telephone callers to the ACD application.

By way of further background, U.S. Pat. No. 6,798,877 discloses an electronic apparatus which is capable of dispensing tickets. A system and method of dispensing lottery game tickets to a purchaser is taught in U.S. Patent Publication No. 2005/0059463. U.S. Patent Publication No. 2005/0089053 teaches a system and method for managing and optimizing multiple virtual end-user service queues.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system and method for managing a call queue and a human queue in branch model deployments of an ACD application is described. In the following description specific details are set forth, such as device types, configurations, display fields, etc., in order to provide a thorough understanding of the present invention. However, persons having ordinary skill in the arts will appreciate that these specific details may not be needed to practice the present invention.

According to one embodiment of the present invention, an ACD application or system communicates with an electronic ticket dispenser located near a customer service desk or counter. The number of the ticket dispensed is sent to the ACD application over an IP network. The ACD application then adds this number to a combined human and caller queue that it is managing. In one embodiment, the combined queue is populated on the order of arrival, regardless of whether the entry represents a caller or a ticket holder. In other words, a person who pulls a ticket out of the ticket dispenser is treated the same as a caller who phones into the ACD application.

When an agent becomes available, the ACD routes the customer at the head or top position of the combined call and human queue to that agent. In the case of a ticket holder in the human queue, he may be routed or directed to an available agent via a loudspeaker system that announces the ticket number of the customer who is to be served next along with the service counter number of the agent assigned to serve that customer. For example, the loudspeaker system might announce, "Now serving ticket number 38 at counter number 3." A visual display may be utilized for the same purpose. After the agent has finished serving the customer, the agent indicates to the ACD application that he is available to serve the next customer. The ACD application then either routes the next caller in the call queue, or the next person in the human queue, to that agent depending on who is currently in the top position of the combined queue.

Figure 1:
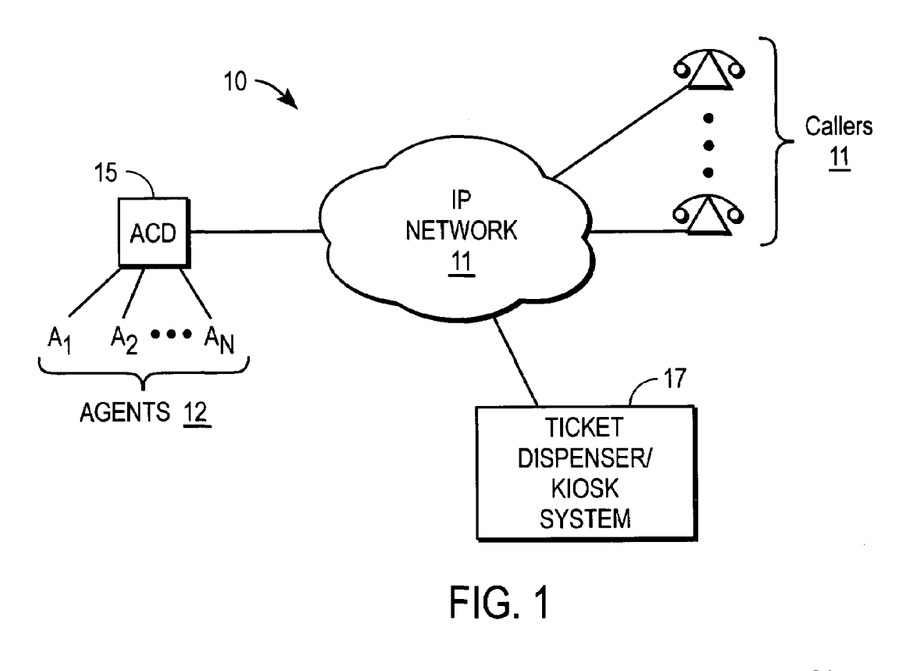
FIG. 1 is a conceptual diagram of a customer service center system in accordance with one embodiment of the present invention.

FIG. 1 shows a high-level diagram of a system 10 in accordance with one embodiment of the present invention. The system includes an ACD 15 configured to receive and route end-users to one of a plurality of agents 12. The end-users comprise telephone callers who may call or dial-in using a variety of different devices 11, which devices may include personal computers (PC) with built-in telephone communication (e.g., softphone) capabilities, cellular telephones, voice-over-IP (VoIP) phones, and conventional desktop telephone sets. Callers may connect with ACD 15 across a variety of network types, including conventional PSTN and IP networks. By way of example, FIG. 1 shows caller devices 11 connected with ACD 15 via IP network 11. ACD 15 includes a number of hardware, firmware, or software modules that implement a variety of IVR scripts, call routing, and other standard ACD functions.

ACD 15 is also shown in FIG. 1 connected with electronic ticket dispenser or kiosk system 17 via IP network 11. In one embodiment, when a person pulls a ticket out of the electronic dispenser of system 17, an interface of ACD 15 receives a message from ticket dispenser system 17 that includes an identifier corresponding to the person pulling the ticket. ACD 15 treats this message as a request to enter the queue on a par with the way it treats an incoming call from a telephone caller. That is, ACD 15 places electronic ticket holders and telephone callers into a memory (e.g., RAM) configured as a combined queue in the order that they arrive at the system.

Figure 2:
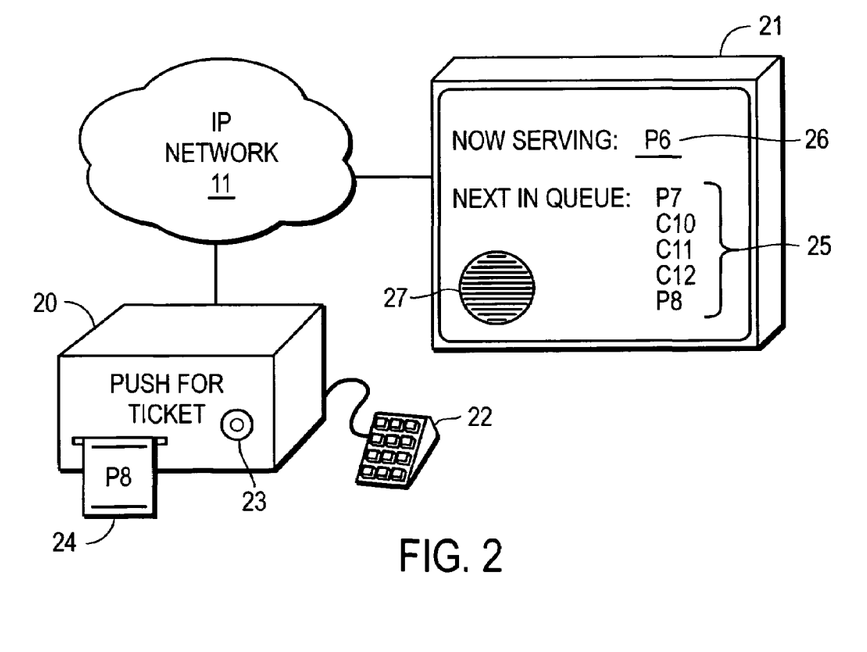
FIG. 2 illustrates an electronic ticket dispenser and announcement system in accordance with one embodiment of the present invention.

An exemplary ticket dispenser/kiosk system 17 is shown in FIG. 2 comprising an electronic ticket dispenser 20 and an announcement/display board or unit 21. In one embodiment, dispenser 20 includes a button 23 that a person presses in order to receive a ticket 24. In this example, ticket 24 is printed with customer identifier (e.g., "P8"). Also shown connected to dispenser 20 is an optional keypad input device 22 that may be used by the person to input user information such as name, title, driver's license number, account number, reason for requesting service, etc., prior to receiving a ticket. This user information, for example, may be utilized by the ACD system to access customer account or user specific information in order to grant priority to certain persons, or for routing the ticket holder to the appropriate agent or service counter. For instance, the user can enter the reason for his visit to the branch, thereby allowing the ACD application to match a particular agent to the customer who is physically present in the branch/store. The announcement unit (discussed in more detail below) may also utilize this information to provide a more personalized experience for the customer. For instance, instead of announcing an arbitrary ticket number, the loudspeaker system may state the person's name, e.g., "Mr. Wilson, please go to counter number four now".

It is appreciated that dispenser 20 may also include an associated display screen or monitor (not shown) for displaying instructions for inputting user information. In this way, keypad 22 and the associated display may function in a similar manner as an IVR system, which is typically used by the ACD to gather information from telephone callers in order to properly route calls and also for priority treatment of certain callers.

Other mechanisms and methods for notifying the ACD of the physical presence of a person or customer at the service counter may also be utilized. For instance, instead of a ticket dispenser, an electronic kiosk with standard IVR and/or speech recognition capabilities may be utilized in which a newly arriving person simply speaks their name, which is then recorded into the system. Another alternative is to employ a receptionist to enter (e.g., via a PC) relevant information about each person who arrives at the branch/store service counter to request service. In either case, the ACD enters each person's name, or an identifier corresponding to each person, into its internal waiting queue. When that person is to be served by the next available agent, a loudspeaker system may be utilized to announce the name of that person.

The system of FIG. 2 also includes an announcement/display unit 21 that includes a loudspeaker 27 for audibly announcing the ticket number of the person now being served, and a visual display screen having a display field 26 that indicates the person now being served. Also included is a "Next in Queue" display field 25, which shows the current state of the combined queue within ACD 15. Display field 25 provides persons waiting for an agent at a service counter (i.e., persons in the human queue) with a visual indication of their current position in the combined caller and human queue. Note that in this example, the telephone callers are designated by the prefix "C", whereas persons in the human queue are designated by the prefix "P". Thus, in the example shown in FIG. 2, the person pulling the ticket "P8" is in the fifth position in the combined ACD queue behind three telephone callers (C10-C12) and the person holding the ticket "P7". The display may also include the estimated wait time and the service counter where the user is directed to go.

Practitioners in the art will appreciate that a great variety of different systems may be employed for the purpose of notifying persons holding tickets when an agent is ready to serve them. For example, in a basic embodiment, unit 21 may comprise only display field 26, without display field 25. In another embodiment, in addition to showing the ticket number now being served, display field 26 may also include the service counter number where the ticket holder should go to be served by a ready agent. In still other embodiments, unit 21 may be implemented without any sort of loudspeaker system, i.e., without loudspeaker 27.

Figure 4:
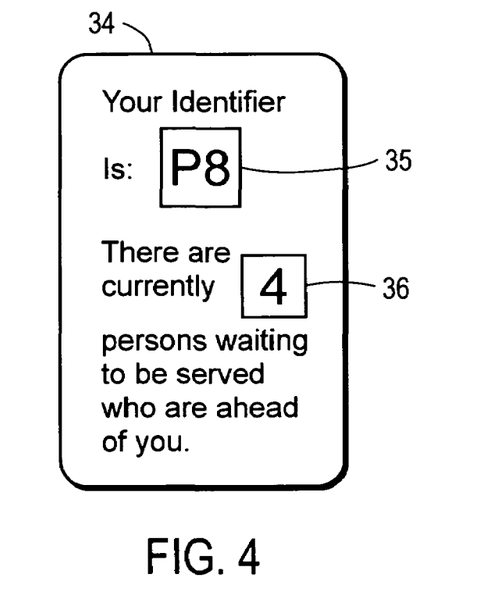
FIG. 4 is an example of a ticket dispensed in accordance with one embodiment of the present invention.

Similarly, in a basic embodiment, electronic ticket dispenser 20 may simply comprise a static device for dispensing/printing tickets 24 in sequential order and sending a corresponding electronic message containing the ticket number to ACD 15. That is, dispenser 20 need not include a keypad 22 or any associated display device. In another embodiment, electronic ticket dispenser 20 may print tickets that not only include a ticket number (or customer identifier), but also an indication of the ticket holder's current position in the combined ACD queue. FIG. 4 shows an example of a ticket 34 printed in accordance with this latter embodiment. As can be seen, ticket 34 includes a ticket number identifier field 35 and an additional field 36 that indicates the person's position in the combined (caller and human) queue. In the example of FIG. 4, ticket 34 is printed with a ticket number "P8" and also indicates that there are four other persons ahead of this ticket number (holder) in queue.

Figure 3:
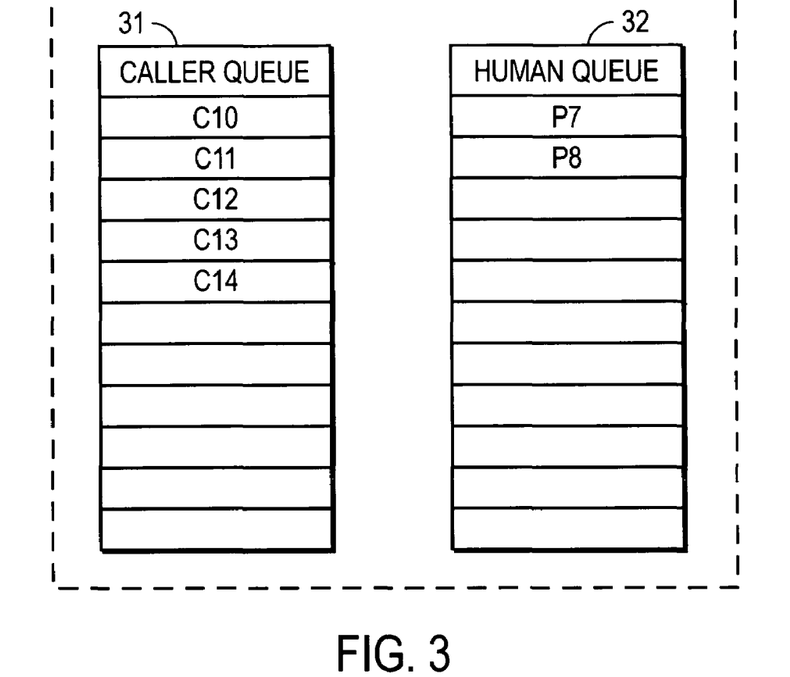
FIG. 3 shows exemplary ACD queues utilized in accordance with one embodiment of the present invention.

It should also be understood that the ACD application may implement a variety of different rules or algorithms applied to either a combined caller/human queue, or for routing individuals from separate caller and human queues to available agents. By way of example, FIG. 3 illustrates an ACD application 15 comprising separate caller and human queues 31 and 32, respectively. Caller queue 31 comprises telephone callers placed in the queue in the order that each call was received. Likewise, human queue 32 is populated with the numbers or identifiers of persons pulling tickets from an electronic dispenser located near the service counter of the branch/store. In the example shown, there are five callers (C10-C14) in queue 31, and two ticket holders (P7-P8) currently in queue 32. According to an exemplary routing algorithm, ACD 15 may route two callers from queue 31 followed by one person from human queue 32. Thus, the effective combined queue ordering according to this algorithm (in order from top to bottom) would be C10, C11, P7, C12, C13, P8, and C14.

It is further appreciated that in certain embodiments the ACD may be configured to grant preferential treatment to users who enter the queue by taking a ticket from the dispenser. Alternatively, ticket holders may be treated with a lower priority, or equally, as compared with callers who entered the queue using the telephony system.

As previously discussed, ACD 15 may also implement various rules that grant priority status to certain persons entering the system. This priority status may depend on the information they input into the system either via keypad entry, speech (using standard speech recognition modules), or some other suitable mechanism. For instance, a person with a particular type of service need or problem, or someone with a particular title might be given priority over others in certain branch models. By way of example, a physician who calls into a pharmacy may be given priority status over other callers and other (non-physician) persons standing in line at the pharmacy counter. In one embodiment, persons with priority may be placed at the uppermost (top) position in the combined queue in order to be routed to the next available agent.

Figure 5A:
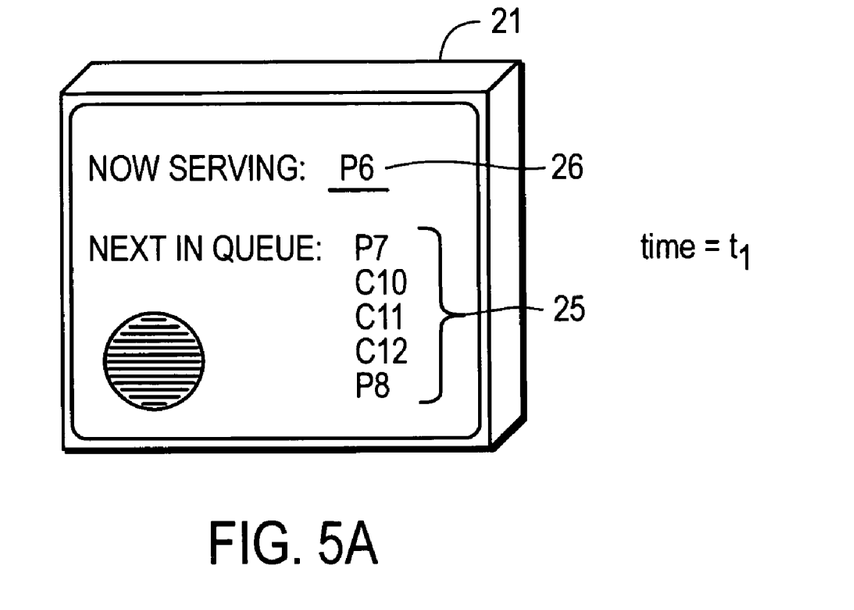
FIGS. 5A & 5B are example display outputs at two different times in accordance with one embodiment of the present invention.
Figure 5B:
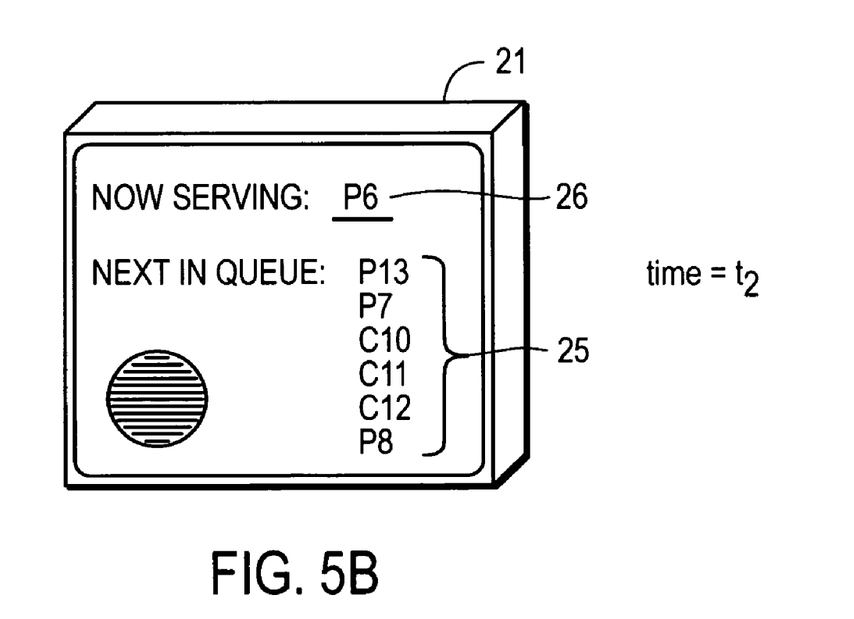

FIGS. 5A & 5B illustrate a visual display unit 21 at two different points in time in accordance with an embodiment of the present invention that includes an ACD application implementing priority queuing. FIG. 5A shows the current state of the ACD combined queue at a time ($t=t_1$) just before a person (i.e., P13) with priority status arrives at the electronic ticket dispenser. As shown in FIG. 5A, display field 26 shows that the person with ticket P6 is presently being served. Display field 25 shows a list of the persons next in queue, in order from top (highest priority) to bottom (lowest priority). In this example display field 25 lists ticket holder P7 as being next in queue, followed by callers C10-C12, with ticket holder P8 being in a fifth position (i.e., last) in the combined queue.

FIG. 5B shows the state of the combined queue shortly after a person with priority status pulls ticket P13 at time $t=t_2$. As can be seen, ticket holder P13 is immediately placed in the combined ACD queue at the top (highest priority) position, resulting in everyone else being pushed down one position in the queue. Note that visual display unit 21 is immediately updated, which has the effect of notifying persons P7 & P8 of their new position in the queue. Similarly, callers C10-C12 may be notified of their relative position in the combined queue (or estimated wait time) via the IVR system, which, for example, may send a whisper message to each caller.

It is appreciated that high priority users may also be handled by different queues where their status in queue is not seen by other users, so as to minimize frustration experienced by those users who are pushed backward in the combined queue on display.

Figure 6:
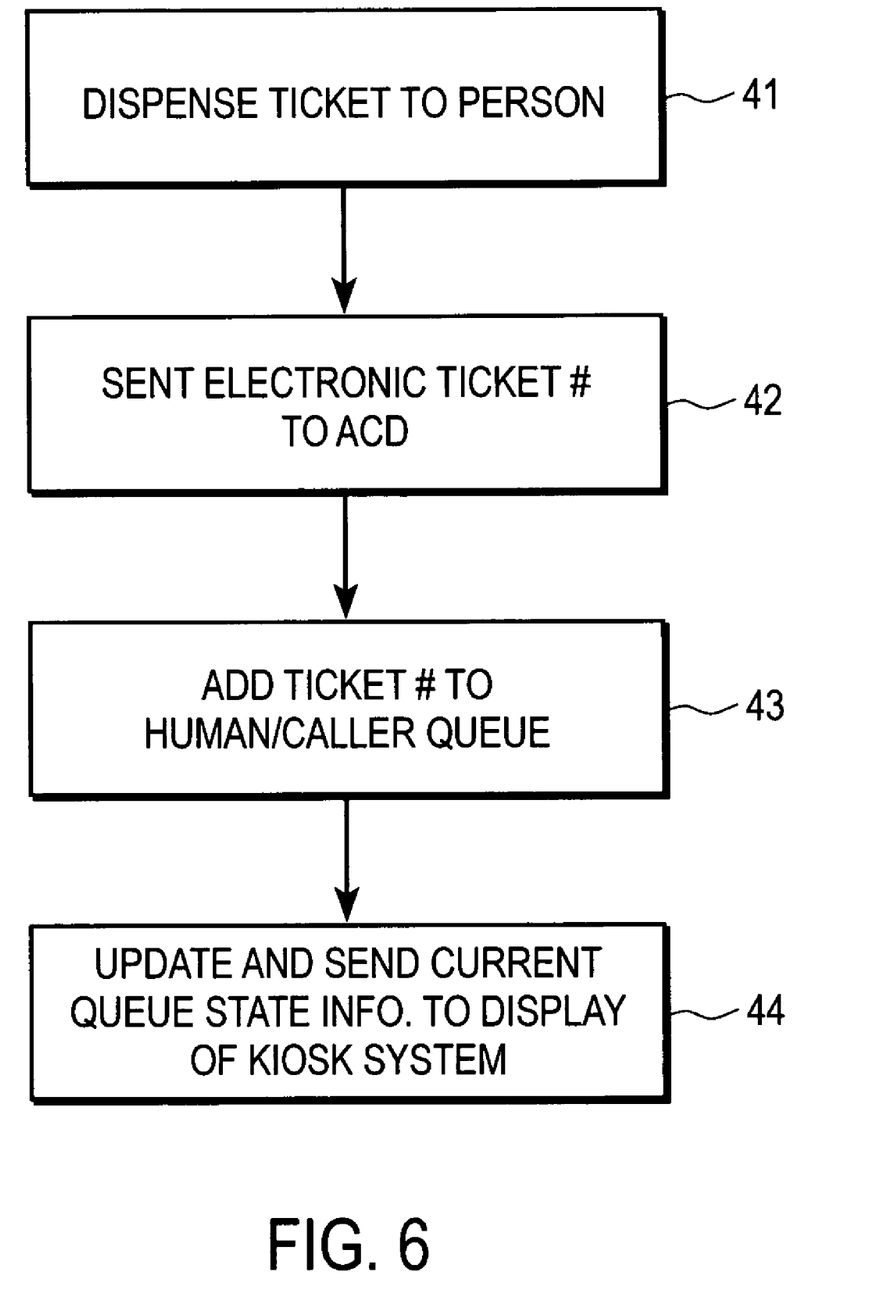
FIG. 6 is a flow chart diagram illustrating a method of operation in accordance with one embodiment of the present invention.

FIG. 6 is a flowchart diagram of a method of operation according to one embodiment of the present invention. The process begins with the dispensing of a ticket to a person who requests service at a branch/store (block 41). When the ticket dispenser dispenses a ticket, it also sends an electronic message to the ACD. The message contains the ticket number that has just been dispensed (block 42). In response, the ACD adds the ticket number (or other identifier) to its combined human/caller queue (block 43). Once the combined queue has been updated, the ACD communicates the current queue state to the display system used to notify persons physically waiting at the branch/store of their relative position in the queue (block 44). Note that this latter step also occurs each time a new caller dials into the system. In certain specific embodiments, when a caller joins the combined queue the ACD may also update the dispenser about the total number of users in queue and/or about the projected wait time.

Similarly, in the situation where many users enter a branch office to request service, thereby resulting in a long queue at that branch office, the system may detect that there are phone agents available at another branch office(s). In such a scenario the system may provide persons standing in line with the option of being serviced via telephone by a service agent at another branch office.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions. Elements of the present invention may be downloaded as a computer program product, wherein the program may be transferred from a remote computer (e.g., a server) to a requesting process (e.g., from a caller device) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A system for handling service requests received from end-users that include telephone callers and persons who are physically present at a branch or store, the system comprising:

an automatic call distributor (ACD);

a ticket dispenser coupled with the ACD, the ticket dispenser dispensing a ticket having an identifier to each person who requests service at the branch or store, the ticket dispenser electronically communicating the identifier to the ACD;

wherein the ACD includes a queue, the telephone callers and identifiers corresponding to the persons physically present at the branch or store being positioned in the queue in a sequential order of arrival, the ACD being operable to route either a call or a person corresponding to an uppermost position in the queue to an agent in accordance with an algorithm.

2. The system of claim 1 further comprising:
a unit that notifies the persons physically present at the branch or store of a current state of the one or more queues.

3. The system of claim 2 wherein the unit includes a loudspeaker system to audibly announce the identifier associated with the ticket of a person next to be served.

4. The system of claim 2 wherein the unit includes a display screen to visually display the current state of the one or more queues.

5. Apparatus for handling service requests received from persons who are physically present at a branch or store, the apparatus comprising:
a ticket dispenser for dispensing a ticket to a person, each ticket having an identifier, the ticket dispenser including:
a request mechanism that dispenses the ticket responsive to input of the person;
an interface for electronically communicating the identifier associated with the ticket to an automatic call distributor (ACD), the ACD being operable to order calls received from telephone callers and identifiers corresponding to the persons physically present at the branch or store in a combined queue, the ACD being further operable to route either a call or a person corresponding to an uppermost position in the queue to an agent in accordance with an algorithm; and
a unit that notifies the persons physically present at the branch or store of a current order of the telephone callers and identifiers corresponding to the persons physically present at the branch or store.

6. The apparatus of claim 5 wherein the unit comprises:
a display that visually displays the current order to the persons physically present at the branch or store.

7. The apparatus of claim 5 wherein the unit comprises:
a loudspeaker system that audibly announces the identifier associated with the ticket of the person when the person is next to be served.

8. The apparatus of claim 5 wherein the algorithm comprises selecting one of the telephone callers and one of the identifiers corresponding to the persons physically present at the branch or store, on an alternating basis.

9. The apparatus of claim 5 further comprising:
means associated with the ticket dispenser for receiving information from the person prior to dispensing the ticket, the information being communicated via the interface to the ACD, and being used by the ACD to determine whether the person should have a priority position in a routing queue of the ACD.

10. A computer-readable memory encoded with a computer program for handling service requests received from end-users that include telephone callers and persons who are physically present at a branch or store, the computer program when executed by a processor is operable to:
dispense a ticket having an identifier to each person who requests service at the branch or store;
communicate the identifier to an automatic call distributor (ACD), the ACD placing the identifier in a position of a combined queue that includes calls received from telephone callers and identifiers corresponding to the persons physically present at the branch or store;
notify the persons physically present at the branch or store of a current state of the combined queue;
update the current state of the combined queue upon receiving a new telephone call or upon dispensing a new ticket; and
notify the persons physically present at the branch or store of the updated current state of the combined queue.

11. The computer-readable memory of claim 10, wherein the computer program when executed by the processor is further operable to announce the identifier associated with the ticket of the person when the person is next to be served.

12. The computer-readable memory of claim 10, wherein the computer program when executed by the processor is further operable to visually display the current state of the combined queue.

13. The computer-readable memory of claim 10, wherein the computer program when executed by the processor is further operable to:
solicit information from the person prior to dispensing the ticket, the information being communicated to the ACD, and being used by the ACD to determine a priority position in the combined queue.

14. The computer-readable memory of claim 13 wherein the information comprises a particular title of the person.

15. The computer-readable memory of claim 13 wherein the information comprises a type of service need.

* * * * *

UNITED STATES PATENT AND TRADEMARK OFFICE
CERTIFICATE OF CORRECTION

PATENT NO. : 7,606,360 B2 Page 1 of 1
APPLICATION NO. : 11/444851
DATED : October 20, 2009
INVENTOR(S) : Patel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

Twelfth Day of October, 2010

David J. Kappos
*Director of the United States Patent and Trademark Office*